US008787870B2

(12) United States Patent
Sporel et al.

(10) Patent No.: US 8,787,870 B2
(45) Date of Patent: Jul. 22, 2014

(54) METHOD, APPARATUS AND COMPUTER PROGRAM PRODUCT FOR PROVIDING EMERGENCY SERVICE VALIDATION

(75) Inventors: Eric R. Sporel, Westford, MA (US); Okeno R. Palmer, Woburn, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1083 days.

(21) Appl. No.: 11/960,219

(22) Filed: Dec. 19, 2007

(65) Prior Publication Data

US 2009/0163171 A1    Jun. 25, 2009

(51) Int. Cl.
H04M 11/04    (2006.01)

(52) U.S. Cl.
USPC ............... 455/404.2; 455/435.1; 455/456.1

(58) Field of Classification Search
USPC .......... 455/404.1–404.2, 414.1–414.2, 435.1, 455/456.1–456.6
See application file for complete search history.

(56) References Cited

U.S. PATENT DOCUMENTS

| | | | |
|---|---|---|---|
| 6,978,132 B1* | 12/2005 | Sladek et al. | 455/432.2 |
| 7,706,356 B1* | 4/2010 | Olshansky et al. | 370/352 |
| 7,711,094 B1* | 5/2010 | Olshansky et al. | 379/45 |
| 2005/0181808 A1* | 8/2005 | Vaudreuil | 455/456.3 |
| 2006/0286961 A1* | 12/2006 | Levitan | 455/404.2 |
| 2007/0104183 A1* | 5/2007 | Bakke et al. | 370/352 |
| 2007/0189492 A1* | 8/2007 | Heinrichs et al. | 379/220.01 |
| 2007/0201622 A1* | 8/2007 | Croak et al. | 379/37 |
| 2007/0218925 A1* | 9/2007 | Islam et al. | 455/466 |
| 2008/0285544 A1* | 11/2008 | Qiu et al. | 370/352 |
| 2009/0003312 A1* | 1/2009 | Velazquez et al. | 370/352 |
| 2010/0142442 A1* | 6/2010 | Pandey et al. | 370/328 |

* cited by examiner

*Primary Examiner* — George Eng
*Assistant Examiner* — Marcus Hammonds

(57) ABSTRACT

An apparatus for providing emergency service validation may include a processor. The processor may be configured to receiving a message associated with a registration event of a device to a communication session. The message may include a parameter having information indicative of a location of the device at a time of the registration. The processor may also be configured to determine whether the location of the device at the time of the registration corresponds to a location where an emergency service dispatch is supportable.

17 Claims, 9 Drawing Sheets

```xml
<?xml version="1.0" encoding="UTF-8"?>
<reginfo xmlns="urn:ietf:params:xml:ns:reginfo" xmlns:xsi="http://www.w3.org/2001/XMLSchema-instance"
xsi:schemaLocation="urn:ietf:params:xml:ns:reginfo"
state="full" version="1">
        <registration state="active" id="sdf7" aor="sip:user@example.com">
                <contact cseq="4294967295" event="registered" state="active" id=ipwal34" Callid="3242343@sbc3">
                        <uri>sip:user@example.com</uri>
                        <display-name xml:lang="en-us">User x<display-name>
              700 ───▶ <user-agent>Linksys/PAP2-3.1.10(LS)<user-agent>
                        <time-of-event>2001-12-17T09:30:47.0Z<time-of-event> ◀─── 701
              703 ───▶ <ext-address ip="1.2.3.4" port="5060">
                        <int-address ip="2.4.5.6" port="5060"> ◀─── 702
                </contact>
        </registration>
</reginfo>
```

FIG. 7

METHOD, APPARATUS AND COMPUTER PROGRAM PRODUCT FOR PROVIDING EMERGENCY SERVICE VALIDATION

BACKGROUND

For a Public Switched Telephone Network (PSTN) service, telephone numbers are tied to a physical infrastructure and known physical addresses. If a user places a 911 call from a telephone having one of these stationary telephone numbers, the physical address for the telephone can be determined by querying an Automatic Location Identification (ALI) database.

For Internet Protocol (IP) phones, the above scenario is not possible because the IP phones can be easily moved from one physical location to another. These IP phones can re-register for service wherever the IP phone can establish an IP connection. In addition, IP phones can be located as "softphones"—software-implemented phones—on IP-capable mobile devices, such as laptops and handheld devices.

Another problem is an IP phone can be assigned a traditional telephone number (e.g., NPA-XXX-XXXX) that is normally associated with a totally different number plan area (area code) and prefix from its actual physical location. The IP phone having a corresponding telephone number may not have a relationship to its corresponding number plan area and prefix for its home location even for an IP phone physically at its home location.

Yet another problem is that several different IP phones, each of which are located at different physical locations, can be registered to the same traditional telephone number. This would be a generalization of the concept of phone extensions, except that for Voice over Internet Protocol (VoIP, also known as Internet telephony), the extensions can be geographically dispersed and nomadic. Therefore, it is difficult to determine the location of each of the IP phones.

BRIEF DESCRIPTION OF THE SEVERAL VIEWS OF THE DRAWING(S)

FIG. 7 illustrates an example of an extended XML schema event according to an exemplary embodiment;

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
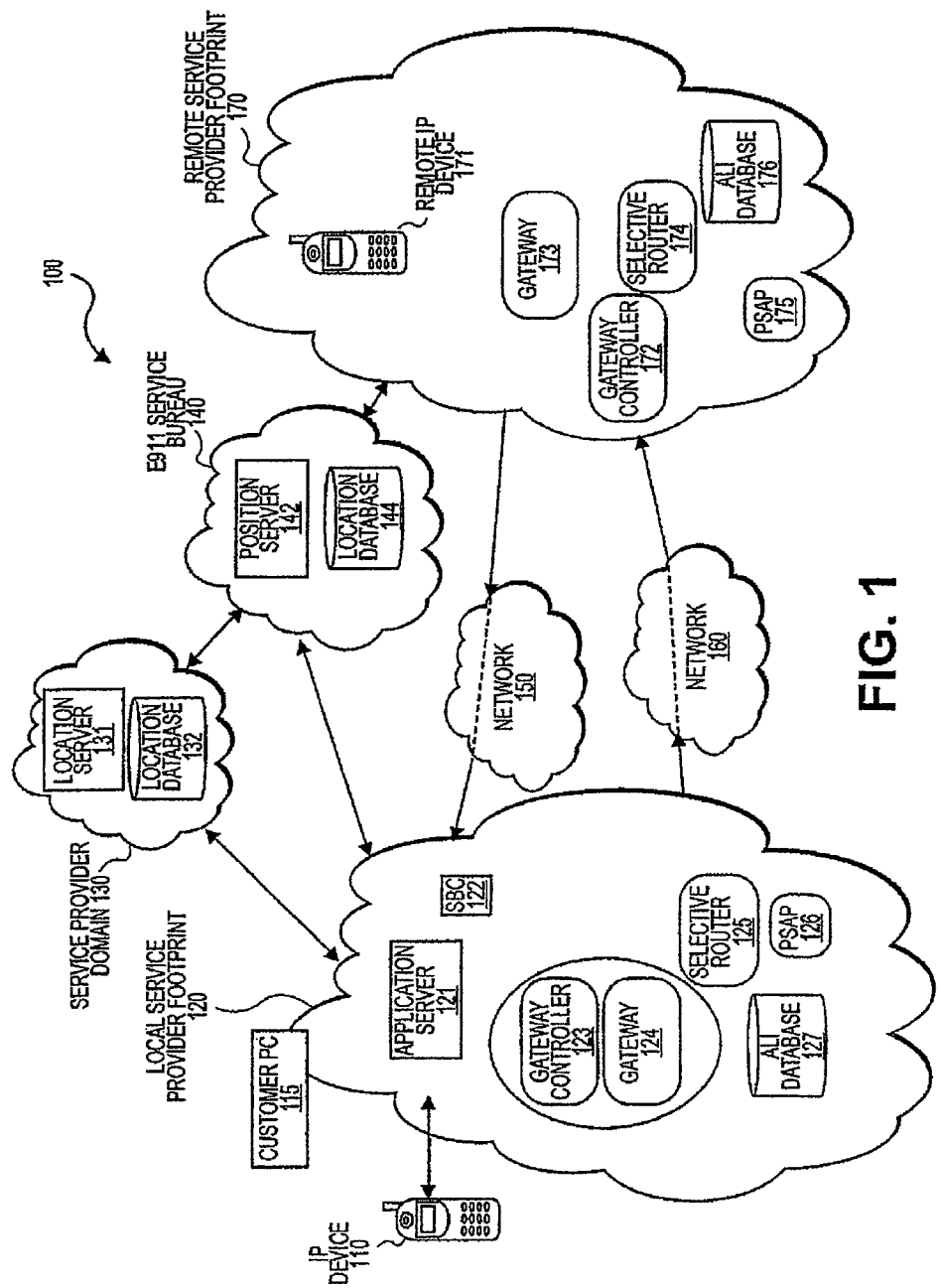
FIG. 1 is a block diagram of an exemplary emergency call network according to an exemplary embodiment.

FIG. 1 is a block diagram of an exemplary emergency call network according to an exemplary embodiment. The exemplary emergency call network 100 can be any type of system that transmits information over a network. For example, emergency call network 100 can be a VoIP system that communicates using data packets that are transmitted over the Internet or some other Internet Protocol (IP) capable network. Emergency call network 100 may include an IP device 110, a personal computer (PC) 115, local service provider footprint 120, a service provider domain 130, a Service Bureau 140, various networks 150, 160, and a remote service provider footprint 170.

IP device 110 may be a device that allows a user to speak to other remote users. For example, IP device 110 can be an IP phone or any device that allows users to make a telephone call using IP transmissions. In some embodiments, IP device 110 may also be a telephone based on a wireless system, for example, an IP cellular telephone, a cellular telephone, or a telephone based on a satellite system. IP device 110 may be a conventional smart phone, such as a PC phone, a Session Initiation Protocol (SIP) phone, and a phone based on the call control standard commonly referred to as H323, which can process signals based on voice and/or Dual Tone Modulation Frequency (DTMF) tones. In some embodiments, IP device 110 may also include a Wireless Access Protocol (WAP) client, such as a cellular telephone, a Personal Digital Assistant (PDA), and a HyperText Transfer Protocol (HTTP) client, such as an Internet browser, which can process signals based on text. As used herein, IP device includes, but is not limited to, all of the above and is not intended to be restrictive in any way.

As shown in FIG. 1, IP device 110 may be connected to the local service provider footprint 120 via a conventional telephone line, a cable television line, a Digital Subscriber Line (DSL), an Integrated Services Digital Network (ISDN) line, a wireless transmission, and/or another communications line. The IP device 110 may also be connected to the service provider footprint 120 through an intermediary. For example, the IP device 110 may be connected to the service provider footprint 120 via a base station and a switch, such as a base station and a switch for a cellular telephone network.

PC 115 can include a processor (CPU) and a memory system including various memories such as RAM, disc drives, etc. Each of the PCs 115 may also include a display or monitor, a keyboard, and possibly one or more additional user input devices (not shown) such as a mouse, joystick or track ball. Typically, the software running on the PC 115 includes an operating system, such as Windows, and a series of compatible application programs running under the operating system. The software preferably implements a graphical user interface, including a user interface for communications to the local service provider footprint 120.

PC 115 can have voice communication capabilities. For example, PC 115 can include a microphone and one or more speakers. PC 115 can also include analog to digital and digital to analog converters, and the CPUs in such PC 115 may run software for compression and decompression of digitized audio (typically voice) information. The software also processes the audio information for transmission and reception of the compressed digital information in IP packets and using the appropriate protocol, for communication with the respective access server.

Local service provider footprint 120 is a communication system. For example, the local service provider footprint 120 can be a wireline or cellular network using IP transport. Local service provider footprint 120 can communicate with a service provider domain 130, a E911 Service Bureau 140, and a remote service provider footprint 170 via network 160. Local service provider footprint 120 may include, among other things, an application server 121, a session border controller (hereinafter "SBC") 122, a gateway controller 123, a gateway 124, a selective router 125, a Public Safety Answering Point (PSAP) 126, and an Automatic Location Information (ALI) database 127.

Application server 121 may be a server that includes software and/or hardware that allows the application server 121 to receive communications or communicate with various other components located in the emergency call network 100. The application server 121 can register the IP device 10 and receive IP call signals from the SBC 122. The application server 121 can communicate with a position server 142 located at the E911 Service Bureau 140. In addition the application server 121 can transmit routing information to the local gateway controller 123 or a remote gateway controller 172 (further discussed below).

SBC 122 may be a VoIP session-aware device that controls call admission to the emergency call network 100 at the border of that local service provider footprint 120, and optionally (depending on the device) performs a host of call-control functions to ease the load on the call agents within the network. In some instances, SBC 122 acts as a firewall so that a customer or another server provider cannot determine how a call is routed. In some embodiments, the SBC 122 can hide external and internal IP addresses. In addition, the SBC 122 can filter register messages and forward copies of the register messages to a location server.

Gateway controller 123 is configured to determine the location of IP device 110 and media capabilities of the IP device 110 so that a level of service can be chosen that may be possible for all users and operators. In some embodiments, the gateway controller 123 can be a CS2K Media Gateway controller provided by Nortel Networks. The gateway controller may 123 receive routing and query data from the application server 121. Based on the routing data, the gateway controller 123 may transmit query data to local gateway 124 or a remote gateway 173 (further discussed below). This communication between the gateway controller 123 and the local or remote gateway 124 or 173 can be conducted using a Media Gateway Control Protocol (MGCP) that handles signaling and session management for a multimedia conference.

Gateway 124 may be a device that converts formatted data provided in one type of network to a particular format required for another type of network. Gateway 124, for example, may be a server, a router, a firewall server, a host, or a proxy server. The gateway 124 transforms telephone signaling information and voice data between packet-based (e.g., IP) and telephony protocols and sends the telephone signaling information, and later the voice data, to the selective router 125 over a voice trunk or a VoIP trunk. Gateway 124 may be capable of processing audio, video, and T.120 transmissions alone or in any combination, and may be capable of full duplex media translations. Also, gateway 124 has the ability to receive query data signals from the gateway controller 123 to allow the local gateway 124 or the remote gateway 173 to connect to a selective router 125 within the same footprint.

Selective router 125 is a router that provides the routing of a E911 call to the proper public safety answering point (PSAP) 126 based upon the ESRN (emergency services routing number). The ESRN is a ten-digit number used for routing to a corresponding selective router. The ESRN is determined by the location of the caller as recorded in an ALI database. The ESQK (emergency service query key) is a ten-digit number assigned by the Service Bureau that receives the 911 call. The ESQK enables the PSAP 126 to correlate the call with an entry in the E911 ALI database that contains the location information and the caller's call back number.

In some embodiments, selective router 125 communicates with a selective router database, which provides the selective router 125 with information for tandem switching of the emergency call and to ensure the routing of emergency call to the proper PSAP 126 along with an automatic number identification (ANI).

PSAP 126 may be an agency responsible for answering emergency calls for emergency assistance from police, fire, and ambulance services. For example, there are roughly 6,500 PSAPs across the United States, where the PSAPs are typically county or city controlled. The PSAP 126 includes an operator console so an operator can determine the location of the emergency caller. PSAP 126 is communicatively coupled to selective router 125 and the ALI database 127.

ALI database 127 is a database correlating ANI and ALI data with a physical location for each telephone connected to a local or remote network. The PSAP 126 uses the ALI database 127 to automatically display the physical location and telephone number of the IP device 110 being used to make the emergency call. Such information allows the PSAP 126 operator to direct the requested services to the proper location, and allows the PSAP 126 operator to call back in the event the connection is lost, or if more information is needed. If the ALI database 127 does not have the necessary information, the ALI database 127 can communicate with the Service Bureau 140 to get the necessary location and number data.

The service provider domain 130 is a group of computers and devices on a network that are administered as a unit with common rules and procedures and share a common name. The service provider domain 130 includes, among other things, a location server 131 and a location database 132. Location server 131 can receive location information from a PC application or from a web server, wherein the user manually inputs the location information into the PC application or the Web GUI. Location server 131 also provides location information updates to the E911 Service Bureau 140. Location server can also validate addresses against a master address guide such as Master Street Address Guide (MSAG). Location database 132 stores information relating to the location of a user.

The E911 Service Bureau 140 provides location and IP device 110 telephone number information to the ALI database 127. The E911 Service Bureau 140 is provisioned with the caller's service address, which may be used as the default static, or home, location as well as routing information to the selective router 125 and PSAP 126. In addition, the E911 Service Bureau 140 provides ESQK information to the local service provider footprint 120 to track the position of a user at an IP device 110. E911 Service Bureau 140, can be, for example, the Intrado Service Bureau. The E911 Service Bureau 140 can include a Service Bureau position server 142 and a Service Bureau location database 144.

Service bureau position server 142 determines location information based on the IP device's 110 telephone number. Service bureau position server 142, for example, can be an Intrado Position Server. Service bureau position server 142 utilizes the IP device 110 (or 171, as discussed below) to determine the correct PSAP 126 (or 175) closest to the emergency site and returns the ESRN and the ESQK to the local service provider footprint 120.

Service bureau location database 144 may be a database that stores location and number information of the static or nomadic IP devices 110 or 171. The service bureau location database 144 can be, for example, an Intrado location database. The Service Bureau location database 144 can be communicatively coupled to an ALI database at any service provider footprint.

Networks 150 and 160 allow remote footprints to communicate with each other. Networks 150 and 160 can be Internet Protocol Virtual Private Networks (IP-VPN), the Internet, or any other suitable network. In some embodiments, the networks 150 and 160 are private networks constructed across a public network or Internet. If the data is sent through a public network, the data sent across could be encrypted so the entire network is private. Consequently, in some embodiments, footprints may include encryption and decryption facilities so that the data transmitted across networks 150 and 160 remains private outside the footprint and public within the footprint.

Remote service provider footprint 170 is a communication system that can be similar to or different than the local service provider footprint 120. For example, the remote service provider footprint 170 can be a wireline or wireless IP network or any other type of communication system. Remote service provider footprint 170 can include, among other things, an application server (not shown), a SBC (not shown), a gateway controller 172, a gateway 173, a selective router 174, PSAP 175, and an ALI database 176, each of which have similar capabilities as those described above for the local service provider footprint 120.

Figure 2:
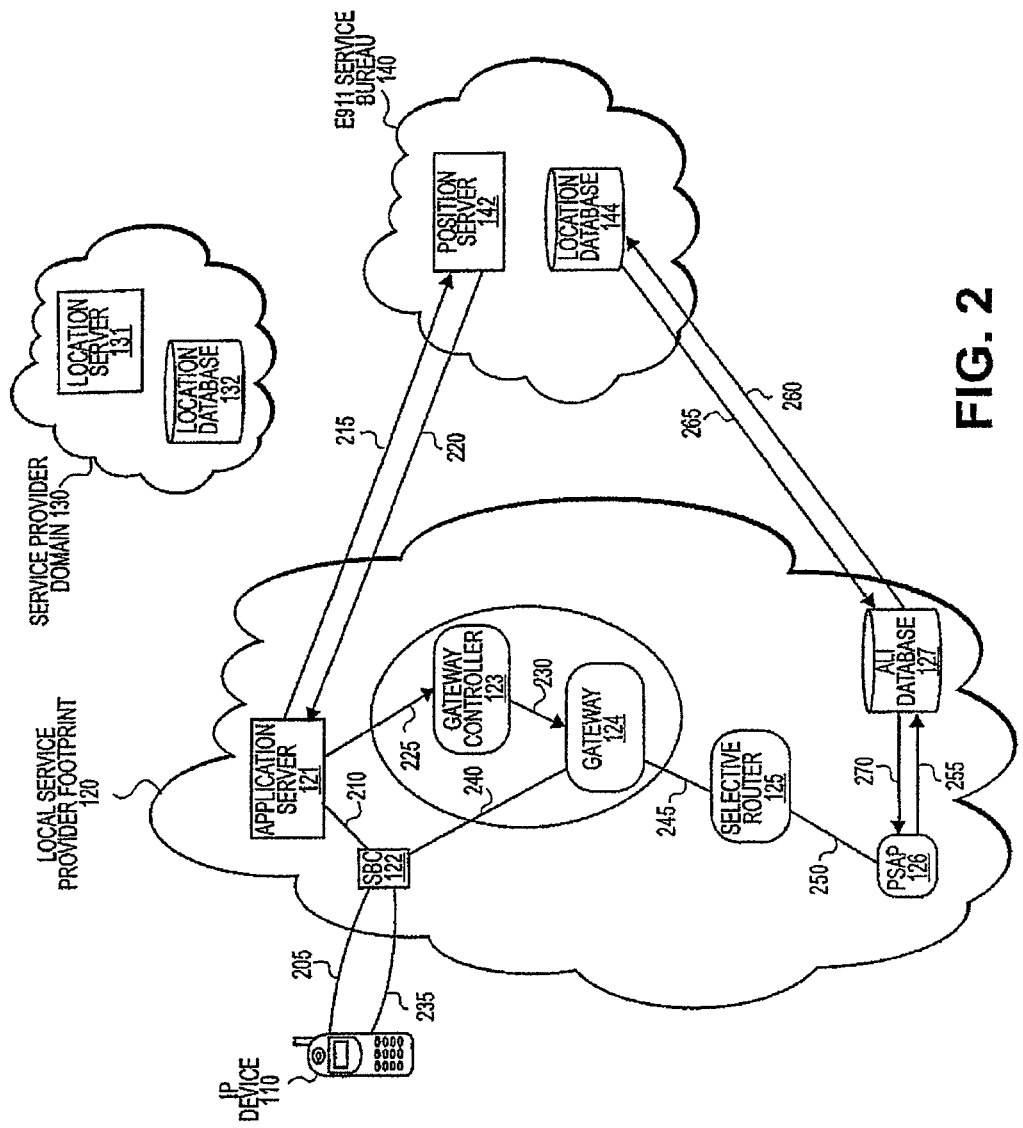
FIG. 2 is a functional diagram showing call flow in the exemplary network of FIG. 1 for providing emergency communication for a static emergency caller according to an exemplary embodiment.

FIG. 2 is a functional diagram showing call flow in the exemplary system in FIG. 1 for providing emergency communication for a static VoIP emergency caller using direct trunking according to an exemplary embodiment. First, the caller dials 911 from the IP device 110 and the IP device 110 transmits (205) the IP call signal to SBC 122. The IP call signal can include a telephone number or other identification of the IP device 110. Once the SBC 122 receives the IP call signal, the SBC 122 can perform call-control functions to the IP call signal. Then, the SBC 122 passes (210) the IP call signaling to the application server 121.

After receiving the IP call signaling from the SBC 122, the application server 121 queries (215) the position server 142 at the Service Bureau 140. For example, the querying can be done using an IP based GRIXE interface, communicating the telephone number, or other identification number, of the IP device 110 to the position server 142.

After the Service Bureau 140 has been queried, the position server 142 transmits (220) ESRN and ESQK parameters to the application server 121 at the local service provider footprint 120. The ESRN can facilitate routing to the appropriate selective router and the ESQK can facilitate routing to the correct PSAP. Also, the ESQK enables the PSAP to correlate the call with an entry in the E911 ALI database that contains the location information and the caller's call back number.

After the application server 121 receives the ESRN and the ESQK, the application server 121 signals (225) to the gateway controller 123 to connect to gateway 124, which interconnects with selective router 125. This allows the application server 121 to route the emergency call to the appropriate gateway controller 123 and gateway 124. The application server 121 can then remove the "911" and populate the called party number with 10 digit ESRN, which the gateway controller 123 can recognize as an emergency call destined to a specific selective router 125. In turn, the gateway controller 123 removes this 10 digit number, populates the called party number with "911". As a result, the gateway controller 123 connects (230) to the gateway 124 and provides the ESQK to the gateway 124 along with a dedicated (TDM) trunk.

After the gateway controller 123 connects to the gateway 124, the IP device 110 establishes (235) Real Time Protocol (RTP) communications with the SBC 122. As a result, the IP device 110 establishes (240) RTP communications with the gateway 124. Then, the gateway 124 converts the communication from IP to Time Division Multiplexing (TDM). The gateway 124 then passes (245) the direct trunking (TDM trunk) and the ESQK to the selective router 125.

The selective router 125 connects (250) the call (now TDM-based) to the PSAP 126, located at the local service provider footprint 120, using the E911 trunks that are based on the ESQK values. As a result, the PSAP 126 queries (255) the ALI database 127 to obtain the IP device's 110 ALI and Automatic Number Information (ANI) to be displayed at the operator console of the PSAP 126. If the ALI database 127 has the ALI and the ANI data, the ALI and ANI data is transmitted (270) to the operator console.

However, if the ALI and ANI data are not stored in the ALI database 127, the ALI database 127 performs a steering operation (260), based on the ESQK, to the location database 144 at the Service Bureau 140 to obtain the ALI data and the ANI data. The location database 144 provides (265) the ANI and ALI data to the ALI database 127. As a result, the ALI database 127 forwards (270) the ALI and ANI data to the PSAP 126 where it is displayed at the operator's console.

Once the operator has the ALI and ANI data, the operator can determine the location of the user so that, if needed, an emergency help team can assist the user.

Figure 3:
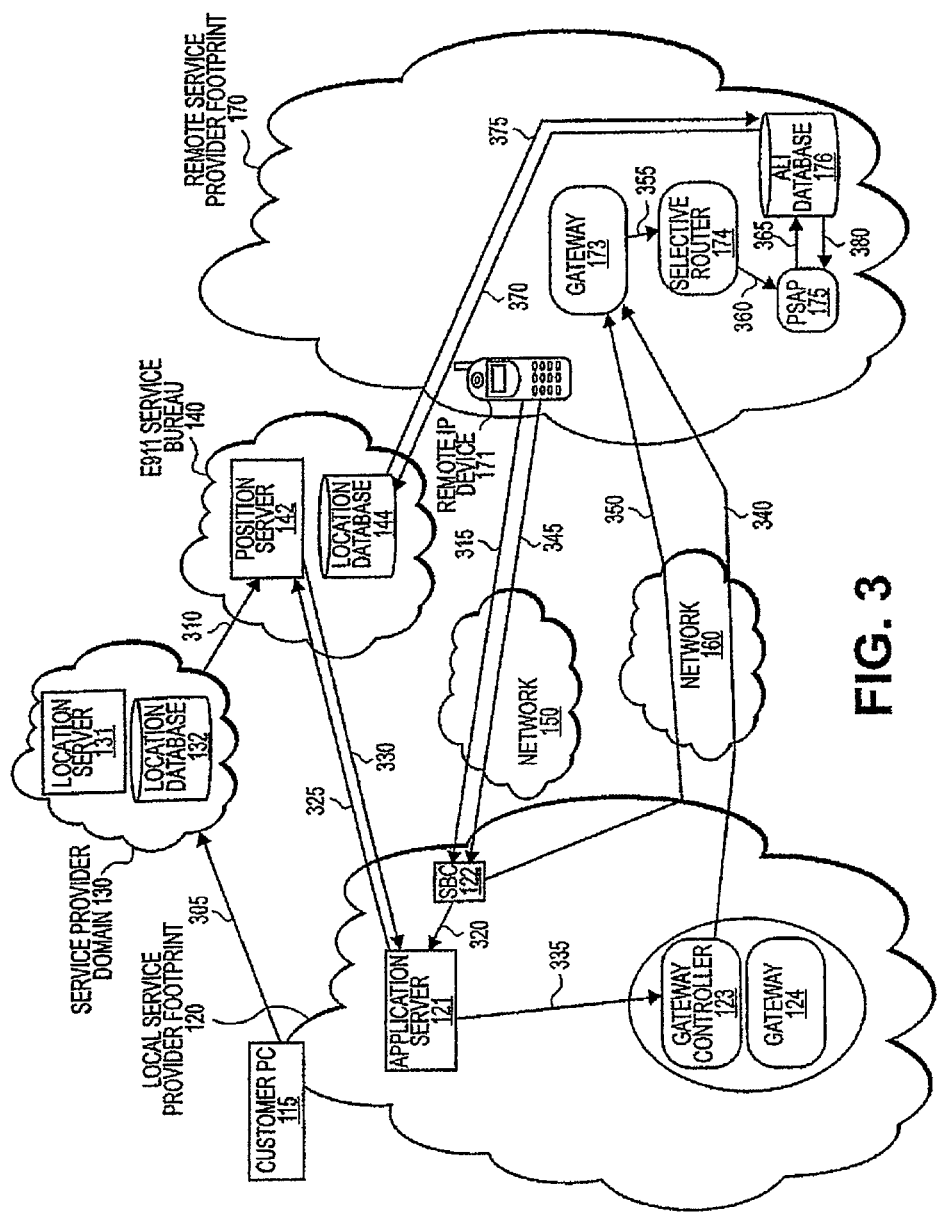
FIG. 3 is a functional diagram showing a first alternative call flow in the exemplary network of FIG. 1 for providing emergency communication for a nomadic emergency caller according to an exemplary embodiment.

FIG. 3 is a functional diagram showing a first alternative call flow in the exemplary system in FIG. 1 for providing emergency communication for a nomadic emergency caller using direct trunking according to an exemplary embodiment. First, prior to placing an emergency E911 call, the user manually updates the location of the remote IP device 171 at the PC 115. The PC transmits (305) this location information to the service provider domain 130. The location database 132 stores the location information of the nomadic remote IP device 171. In addition, the location server 131 at the service provider domain 130 forwards (310) the location information of the IP device to the position server 142 at the Service Bureau 140 to inform the Service Bureau 140 of the change of location of the remote IP device 171.

At some time after the Service Bureau 140 has received the remote IP device's location information, the caller dials 911 from the remote IP device 171 and the IP device 110 transmits (315) the IP call signal to the SBC 122 via network 150. Once the SBC 122 receives the IP call signal, the SBC 122 can perform call-control functions to the IP call signal. Then, the SBC 122 passes (320) the IP call signaling to the application server 121. After receiving the IP call signaling from the SBC 122, the application server 121 queries (325) the position server 142 at the Service Bureau 140. The application server 121 communicates the telephone number or any other identification number of the remote IP device 171 to the position server 142.

After the Service Bureau 140 has been queried, the position server 142 accesses the location database 144 and, based on the telephone number or other identification of the remote IP device 171, transmits (330) ESRN and ESQK parameters to the application server 121 at the local service provider footprint 120. The ESRN can facilitate routing to the appropriate selective router, for this example selective router 174, and the ESQK can facilitate routing to the correct PSAP, for this example PSAP 175. After the application server 121 receives the ESRN and ESQK data, the application server 121 signals (335) to the gateway controller 123 located at the local service provider footprint 120 to connect, via network 160, to gateway 173 located at the remote service provider footprint 170.

The application server 121 can then remove the "911" and populate the called party number with a 10 digit number, which the gateway controller 123 can recognize as an emergency call destined to the selective router 174. In turn the gateway controller 123 removes this 10 digit number and populates the called party number with "911". As a result, the gateway controller 123 connects (340) and provides the ESQK to the gateway 173 located at the remote service provider footprint 170, for example, via network 160.

After the gateway controller 123 connects to the gateway 173, the remote IP device 171 establishes (345) Real Time Protocol (RTP) communications with the SBC 122 at the local service provider footprint 120 via network 150. As a result, the remote IP device 171 establishes (350) RTP communications with the gateway 173 through the SBC 122 via networks 150, 160. Then, gateway 173 converts the communication from IP to Time Division Multiplexing (TDM). The gateway 173 then passes (355) the direct trunking (TDM trunk) and the ESQK to the selective router 174.

The selective router 174 connects (360) the call (now TDM-based) to the PSAP 175, located at the remote service provider footprint 170, using the E911 trunks that are based on the ESQK values. As a result, the PSAP 175 queries (365) the ALI database 176 to obtain the remote IP device's ALI and ANI data to be displayed at the operator console of the PSAP 175. If the ALI database 176 has the ALI and the ANI data, the ALI and ANI data is transmitted (380) to the operator console at the PSAP 175.

However, if the ALI and ANI data are not stored in the ALI database 176, the ALI database 176 performs a steering operation (370), based on the ESQK, to the location database 144 at the Service Bureau 140 to obtain the ALI data and the ANI data. The location database 144 provides (375) the ANI and ALI data to the ALI database 176 at the remote service provider footprint 170. As a result, the ALI database 127 forwards (380) the ALI and ANI data to the PSAP 175 where it is displayed at the operator's console. The ALI and ANI data allow an operator to determine the location of the user of the remote IP device.

Figure 4:
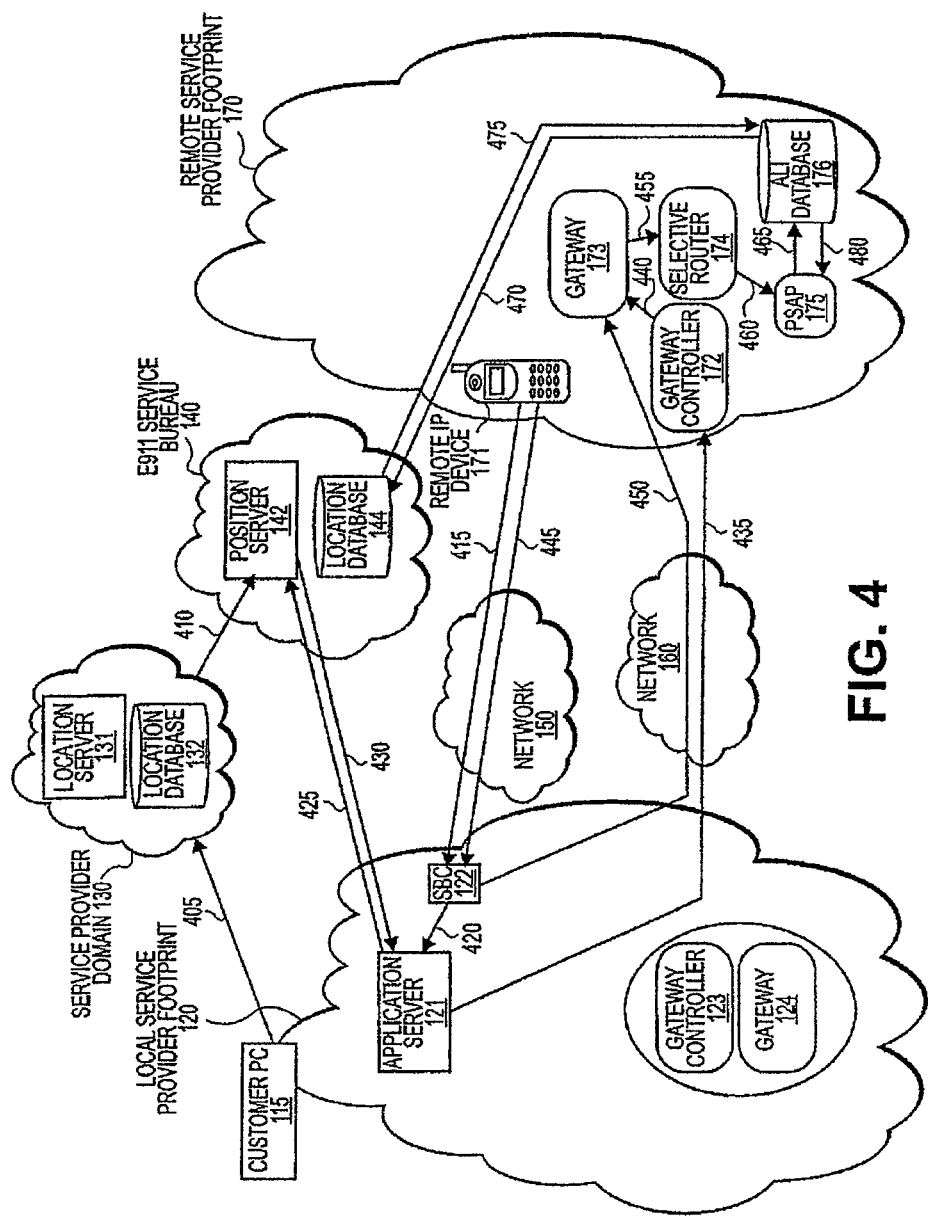
FIG. 4 is a functional diagram showing a second alternative call flow in the exemplary network of FIG. 1 for providing emergency communication for a nomadic emergency caller according to an exemplary embodiment.

FIG. 4. illustrates an alternate embodiment to that of FIG. 3. The call processing illustrated in FIG. 4 is similar to that of FIG. 3, except that the application server 121 signals (435) to the gateway controller 172 located at the remote service provider footprint 170 (instead of the local gateway controller 123), which accordingly connects with (440) and provides the ESQK to the gateway 173.

Figure 5:
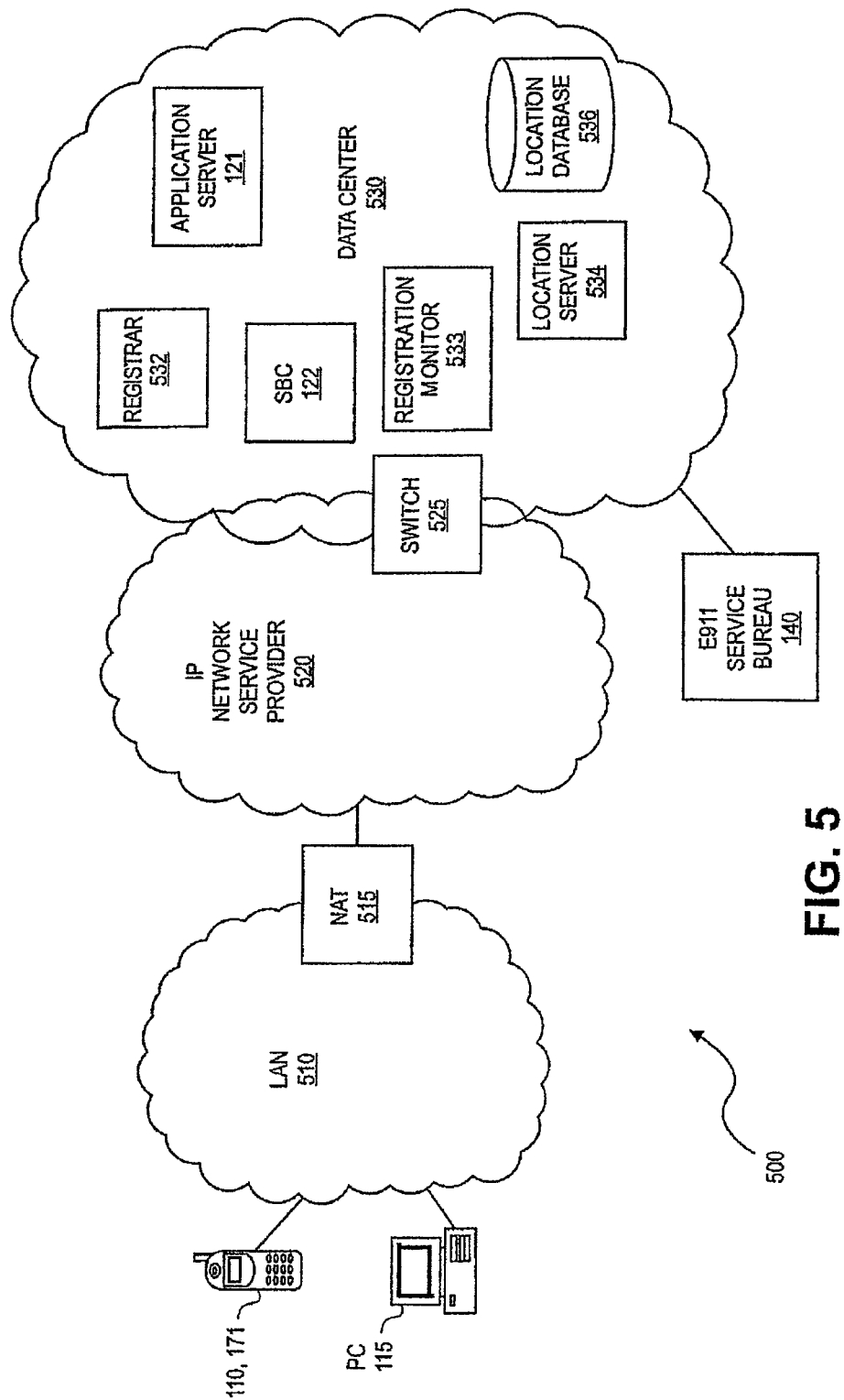
FIG. 5 is a block diagram of an exemplary system for providing registration and re-registration of an IP device according to an exemplary embodiment.

FIG. 5 is a block diagram of an exemplary system for providing registration and re-registration of an IP device 110. The exemplary system includes an IP device 110, a PC 115, an E911 Service Bureau 140, and a network-based system 500. Network-based system 500 includes a local area network (LAN) 510, an IP Network Service Provider 520, and a data center 530.

LAN 510 is a group of computers and associated devices that share a common communications line or wireless link and typically share the resources of a single processor or server within a small geographic area, such as an office building or small neighborhood. Usually, the server has applications and data storage that are shared in common by multiple computer users. A LAN may serve as few as two or three users (for example, in a home network) or as many as thousands of users (for example, in a fiber distributed data interface (FDDI) network). In some embodiments, a LAN could be replaced by multiple devices being connected to a WAN, such as broadband (DSL or Cable modem) service providers.

Network address translation (NAT) facility 515 may be located on the fringe of the LAN 510 to prevent or at least hinder external users from learning the internal IP addresses of the LAN 510. NAT 515 enables the LAN 510 to use one set of IP addresses for internal traffic and a second set of IP addresses for external traffic. This enables multiple hosts on a private network to access the Internet using a single public IP address. As communication traffic passes from the LAN 510 to the IP network service provider 520, the source address on the data packets are translated from private IP addresses to public IP addresses. Typically, a company translates its private IP addresses to one or more public IP addresses and untranslates the public IP addresses on incoming packets back into private IP addresses. NAT 515 may be included as part of a router and can often be part of a corporate firewall.

IP Network Service Provider 520 provides direct backbone access to the internal network for users and usually access to its network access points. In some embodiments, the IP Network Service Provider 520 includes a switch (e.g. an Ethernet switch). The switch allows for multiple IP devices 110 or 171, such as a softphone on a PC 115 or a second hard phone at an office or home, using the same phone number to connect to the application server 121. In telecommunications, a switch is a network device that includes facilities to select a path or circuit for sending a unit of data to its next destination. A switch may also include the function of the router, a device or program that can determine the route and specifically to what adjacent network point the data should be sent.

Data Center 530 may include several components that assist with the registration and the re-registration of the IP device 110 or 171. For example, Data Center 530 can be an Internet Telephone Service Provider Data Center. The Data Center 530 can include, among other things, an application server 121, a SBC 122, a registrar 532, a location server 534, and a location database 536. In some embodiments, the Data Center 530 can be a part of and within the IP Network Service Provider 520.

Registrar 532 may be a server that receives registration requests from IP devices, such as IP device 110. The registrar 532 processes registration requests and may transmit data within the register requests to the location server 534. In addition, the registrar 532 may support authentication. In some embodiments, the registrar 532 and the SBC 122 may both be located within the Data Center 530.

In some embodiments, there may be a registration monitor 533. The registration monitor 533 intercepts the register messages and/or copies of the register messages before they reach the SBC 122. The registration monitor 533 can, for example, either: (1) copy registration messages and forward the copy to the location server 534; or (2) perform some processing of the registration message and forward certain registration information to the location server 534. In some embodiments, the registration monitor 533 can forward changes to a device's IP address information. The registration monitor 533 may attach to a port of a switch/router. This allows the registration messages to be intercepted prior to reaching the SBC 122 or the registrar 532, or alternatively, use of a "Y-cable" to receive copies of all VoIP signaling messages being sent to the SBC 122 or the registrar 532. Functions of the registration monitor 533 may be built into other network or data center elements such as switches, routers, or SBCs.

Location server 534 may be a server that obtains information about a user's possible location. For example, the location server 534 may be used in conjunction with VoIP phone service. Location server 534 may create mappings of the IP device's identity to a location information, where the location information can be the internal and/or external IP addresses, or a physical address based on the internal and external IP subnets used at that physical address. Location server 534 uses the IP address information contained in VoIP registration message to determine if the device is at a known physical location whenever the device attempts to register or re-register. If the registration message reveals an external or internal IP address that does not map to the IP subnets associated with a known location for that IP device, the location server 534 marks the data base entry for that device as being in a roaming state and attempts to determine the new physical location by querying the device or the user of the device. In some embodiments, the location server 534 can enable multiple devices at different locations to share a single telephone number by using IP subnets to determine the location of the IP device 110. Also, location server 534 may provide location updates that the E911 Service Bureau can enter in its location database 144.

Any physical address entered in the location server database may be validated against a master directory of valid addresses such as a Master Street Address Guide (MSAG). If the physical address provided by an end-user or an end-user's proxy can not be validated against a master directory, the associated device can not receive E911 services. The physical address can be either a civil address including building identifier, street number, street, city, state, zip code, or a geocoded location, such as latitude and longitude.

The E911 Emergency Service Bureau 140 may be a service platform and may connect directly to the Data Center 530 with connection 680 (see FIG. 6), or may connect to the Data Center 530 indirectly using an external network such as Network 520. It should be understood that the functions of the Emergency Service Bureau 140 could also be performed directly by the VoIP service provider, and could be located in the Data Center 530 or the service provider's network. In some embodiments, the location information may only be stored within the Data Center 530. In some embodiments, the E911 Emergency Service Bureau 140 can be replaced by another service platform, such as toll-free services or information services like "411." In some embodiments, the location server 534 may route the location information to a general routing function that provides many of the Advanced Intelligent Network (AIN) functions for routing determinations by, for example, an Integrated Service Control Point (ISCP).

Location database 536 may be a database that stores pertinent data for the location server 534. For example, when a business signs up for an IP telephone service, the enterprise can provide the service provider with an inventory mapping of external IP addresses and internal IP subnets that are used at each physical address. The service provider assigns the customer certain telephone numbers to be used by IP device 110 or 171 at various locations. The location server 534 can create location information to be stored at the location database 536. The location information stored at the location database can include, among other things, the registration device identity, the telephone numbers, location status, physical address, external IP address, customer's internal IP subnets, and Direct Inward Dial (DID) numbers. If the VoIP protocol is SIP, the device identity may be the SIP User ID that identifies the SIP endpoint. In some embodiments, the device identity could be the same as the telephone number, the telephone number with some additional characters appended, or some other unique identifier. The location status, for example, is used to indicate whether the telephone number is unregistered (U), at the physical home address (H) where the telephone number was first assigned by the service provider, or roaming (R) to a new site. The location database 536 may contain a field associated with each device indicating which physical address (if any) is presently registered with the Service Bureau for that device. The customer's internal IP subnets can be either private addresses, as defined by RFC 1918, or publicly routable IP addresses. In some embodiments where one or more external IP addresses are shared by multiple physical addresses, it is assumed that the private IP subnets can be mapped to well-defined physical addresses. The service provider may require the customer to impose a stable mapping of IP subnets to physical locations so that the emergency call network 100 can locate the user in an emergency situation.

Figure 6:
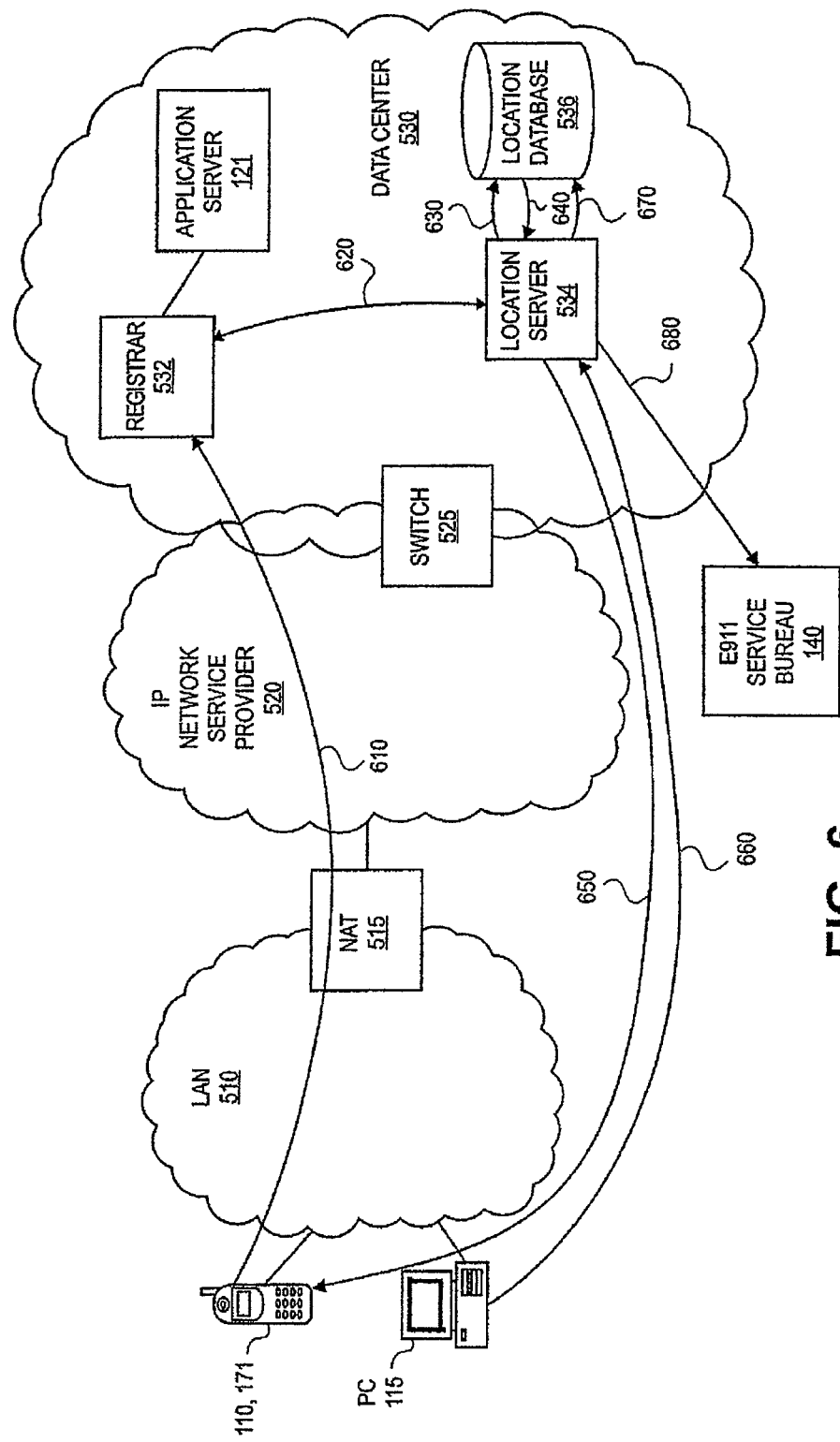
FIG. 6 is a functional diagram showing message flow in the exemplary system of FIG. 5 for providing registration and re-registration via a registrar according to an exemplary embodiment.

FIG. 6 is a functional diagram showing message flow in the exemplary system in FIG. 5 for providing registration and re-registration via a registrar. In this exemplary embodiment, it is assumed that the IP device's IP address is not known at the location database and the external IP address does not match the internal IP address of the device. In addition, in this exemplary embodiment, it is assumed that the IP device 110 is connected to the LAN and has an assigned telephone number, an assigned device identity, and an assigned private address, for example, the telephone number 781-466-1234, device identity 7814661234.devicename and address 192.168.1.57 (which may be assigned by a Dynamic Host Configuration Protocol (DHCP) server for the LAN).

First, the IP device 110 or 171 attempts to register (610) by sending a REGISTER message, which includes a registration packet, using a VoIP protocol to the external registrar, such as external registrar located at address 4.3.2.1. For example, the VoIP protocol can be SIP. This registration request passes through the NAT. The NAT changes the source address of the packet to correspond to the external address of the site, such as an external address 6.7.8.9, and forwards the packet over network 520. The registrar 532 receives the registration packet and determines the telephone number and the private IP address from "Contact Header," "Via," or other fields in the registration message, and the external IP address is determined from the source address of the IP packet. For example, the contact header can be a SIP Contact Header "<sip:7814661234.devicename@192.168.1.57:5060>" and the SIP message includes Via information "SIP12.0/UDP 192.168.1.57:5060."

After the IP device 110 registers with the registrar 532, the registrar 532 transmits registration data to (620) the location server 534 and its database 536. Based on the received data from the registrar 532, the location server 534 uses the IP address information to determine if the device is at a known physical address. The device may be identified by a telephone number (TN), by a TN with an extension, such as TN.devicename, or by some other globally unique identifier available in the registration message.

The location server 534 then queries (630) the location database 536 for the stored IP address information or physical address information associated with the device. If the physical address information is provided, the location database may also indicate whether that physical address is presently registered with the E911 Service Bureau 140.

The location database 536 transmits (640) the stored data to the location server 534. The location server 534 compares the external IP address and the internal IP subnets found in the registration request with the IP address information associated with the device stored at the location database 536. If there is a match and the associated physical address is presently registered with the E911 Service Bureau 140, no further action is required. If that physical address is not registered with the Service Bureau 140 for that device, then the location server sends a message (680) to the Service Bureau to register that device at the physical address retrieved from the Location Database 536.

However, if there is not a match, as in this case, the location server 534 attempts to match the external IP address and the internal IP address to other entries in the location database. In this example the IP addresses provided in the registration message fail to match the external and the internal IP address stored in the location database 536, and the location database 536 marks the location status as being "U" for unknown location for that device.

After the location database 536 stores the location status for the IP device 110 or 171, having identity "7814661234.devicename," as being located at an unknown location, the location server 534 has business rules that determine how to treat an unknown location for an IP device. In some embodiments, the location server 534 attempts to contact (650) the IP device or the user to determine the present physical address for the device. Contacting the user could include placing a call to the telephone number, sending a text message or page, sending an e-mail, sending an instant message (IM), or activating a dialogue window in the case of a soft client on an IP device. The message requests that the user provides location information to the location server 534. In response, the user provides (660) the location information to the location server 534 by inputting location information to a web browser located at the PC 115. In some embodiments, the user can input the location information at the IP device, via a web browser, a text message, or by a dialogue window opened by a soft client on that device. In some embodiments, the IP device itself may have means to determine its own location using a Global Positioning System or other means. In this case, the location server can query the device to determine its physical location as provided by a geocode or other means for location identification.

Once the location server 534 receives updated location data from the user or the IP device, it can validate that location data against a master directory such as the MSAG. The validated location data is stored (670) into the location database as the new physical address and the status field may be marked as "R" for roaming. On the other hand, if the user or IP device fails to provide the location data that can be validated, the location server 534 may take one or more business rules, which can include the following actions: repeating the request for location information, placing a phone call to the user at the telephone number and inform the user that the VoIP phone cannot be used for 911 calls, requesting an acknowledgement that the user is unable to provide address information, de-registering the phone by sending a de-registration request to the Registrar 532, or directing the user to use other means to make any E911 calls.

Once the validated location information is updated at the location database 536, the location server can then forward (680) the information to the E911 Service Bureau 140 for future reference in case the IP device calls E911. In some embodiments, the Service Bureau 140 can confirm that the transmitted information has been accepted and entered in its location database 144 as the physical location for that device. If a positive confirmation is received, the location server sends a message to the location database to mark that location as active with the Service Bureau. If a positive confirmation is not received by the location server, other business rules may be performed.

Referring again to FIG. 5, an alternative embodiment will be described in greater detail. In this alternative embodiment, it may be possible to determine whether a user registering for a communication session related to an IP based mode of communication is located in a particular location where emergency services can be provided. Accordingly, for example, if requirements (e.g., FCC requirements) were to require compliance with guidelines demanding that service providers verify that users to which service is being provided are within an area where emergency services can be provided, embodiments described herein may enable service providers to comply with such requirements. In this regard, for example, embodiments described herein may provide that additional information related to a user's actual IP address, and not just their account information, may be provided so that the service provider may audit and take corrective action if the user is determined to be in a location that is different from the location indicated by the user's default service account address. Through the additional information, the service provider may acquire updates to user location and, if the updated location is in an area where emergency services cannot be provided, the corrective action may include suspension of the user's account until the user is in a location where emergency services can be provided.

Furthermore, embodiments may provide that verification of the user's location (e.g., with respect to the ability to provide emergency services) may be accomplished via non-intrusive monitoring of registration signal messaging. For example, if the user is registering for a SIP session, the registration message may be monitored and the signaling may be processed as provided below to ensure validation with respect to an ability to provide emergency services may be accomplished. The monitoring may be accomplished, for example, via the registration monitor 533 (e.g., a RegMon server) that is configured to provides updated location information to a location server (e.g., the location server 534) via a web services interface in order to maintain a view of the user's presence information. The registration monitor 533 may provide details of user registration parameters like, for example, the SIP Address of Record (AOR) that corresponds to the user's account information. Moreover, the registration monitor 533 may provide a registration schema that includes parameters that allow the physical location of the user to be validated against the ability to provide emergency services in the event of an emergency.

Exemplary embodiments may extend the data model of user registration event state as defined in IETF RFC 3680. In this regard, additional information elements or parameters may be added to the registration event (e.g., to the registration event XML schema) by the registration monitor 533. More specifically, the registration monitor 533, which may include a processor or processing element configured to execute instructions stored in a memory of, or accessible by, the registration monitor 533, may be configured to monitor user registration and add parameters to registration related messages communicated to the location server 534. The location server 534 may then use the added parameters for validation against the ability to provide emergency services in the event of an emergency.

In one exemplary embodiment, the added parameters may include a user-agent element, a time-of-event element, an external address (e.g., external IP address), and/or an internal address. The user-agent element may include information indicative of a characteristic of the device registering. For example, the user-agent element may include information indicative of a manufacturer of the device, a type of the device, a firmware release of the device, or the like. The time-of-event element may include a time when the registration event is actually detected. Thus, as opposed to relying on rapid delivery of messages to ensure messages are not received out of order, conflicts with respect to user state may be avoided. The user-agent and time-of-event elements may allow tracking of multiple devices that may be associated with the same user account and the exact time/date when events associated with each of the multiple devices are detected in the network. Due to various failure scenarios, there are potential race conditions (e.g., two events occurring in close temporal proximity that arrive in the wrong order) and network topology issues (e.g., rerouting via longer routes) that can delay delivery of messaging resulting in a conflicting user state. Accordingly, the inclusion of the actual time of the detection on the network of an event associated with a particular device in an environment where monitoring servers are synchronized to a common time source may reduce the occurrence of possible conflicting user states.

The internal and external addresses are provided so that the IP address and port number, the combination of which uniquely identifies a message as being associated with a single device may provide an indication of the device location at the time of registration in a non-intrusive manner. In this regard, the external address information may be the user's public IP address, for example, when the IP device (e.g., customer premises equipment (CPE)) is located behind a network address translation (NAT) router. Accordingly, the registration monitor 533 may monitor and capture the source IP address and the local non-routable internal address in the signaling messages (e.g., SIP signaling messages) provided by the IP device. The registration monitor 533 may then include the internal and external addresses in a message communicated to the location server 534 so that the external address (e.g., the external IP address) may be validated as being the same as the external address provided by the user when the user provided a physical location of the user for validation during a prior registration event in a location where emergency services were available. The location server 534 may utilize the added parameters for the validation and, if the external address has changed from the external address of the prior registration, the location server 534 may initiate communications for the suspension of the user's account until the user is located in an area that can be verified as an area in which emergency services can be provided e.g., in the event of an emergency.

FIG. 7 illustrates an example of an extended XML schema event according to an exemplary embodiment. The example of FIG. 7 illustrates a message generated by the registration monitor 533 for transmission to the location server 534. FIG. 7 shows a user-agent element 700, a time-of-event element 701, an internal address 702 and an external address 703, which are each examples of the extended schema provided by exemplary embodiments. However, it should be noted that FIG. 7 is merely provided by way of example and the format and values in FIG. 7 should not be seen as limitations.

Accordingly, as indicated above, the registration monitor 533 in an exemplary embodiment may be configured to monitor messaging related to registration at the IP layer and obtain information in order to generate the added parameters described above (e.g., the user-agent element 700, the time-of-event element 701, the internal address 702 and/or the external address 703) for transmission to the location server 534. The location server 534, for example, via a processor of the location server 534 that is configured to execute instructions stored at or in a computer readable storage medium accessible to the location server 534, may be configured to utilize the internal address (e.g., source IP address) and the external address for validation of the location of the device registering with respect to an ability to provide emergency services.

Figure 8:
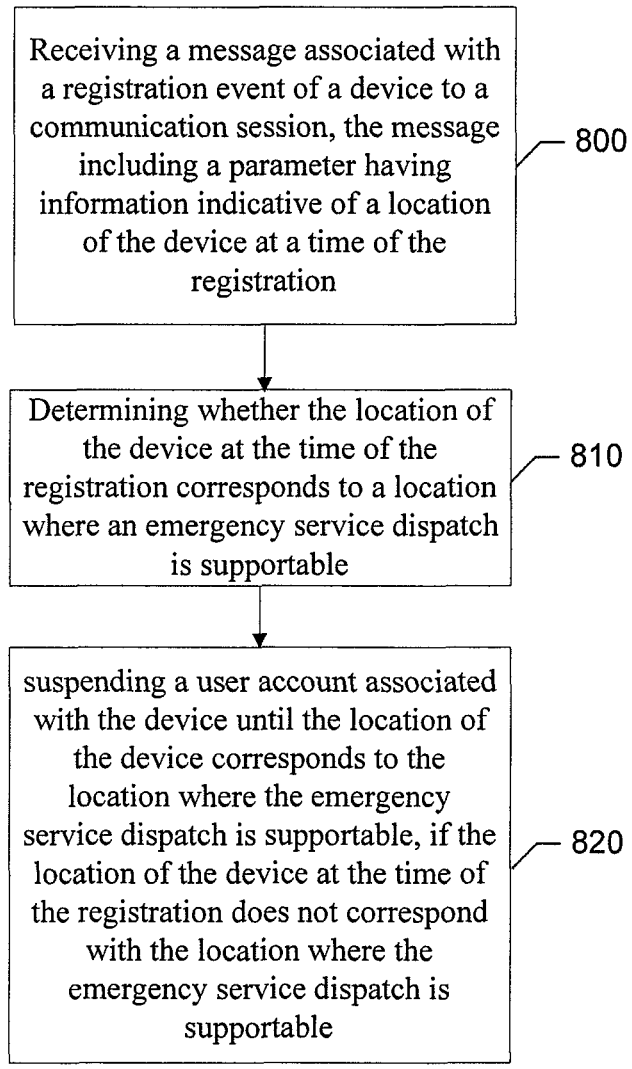
FIG. 8 is a flowchart according to an exemplary method and program product for providing emergency service validation according to an exemplary embodiment.
Figure 9:
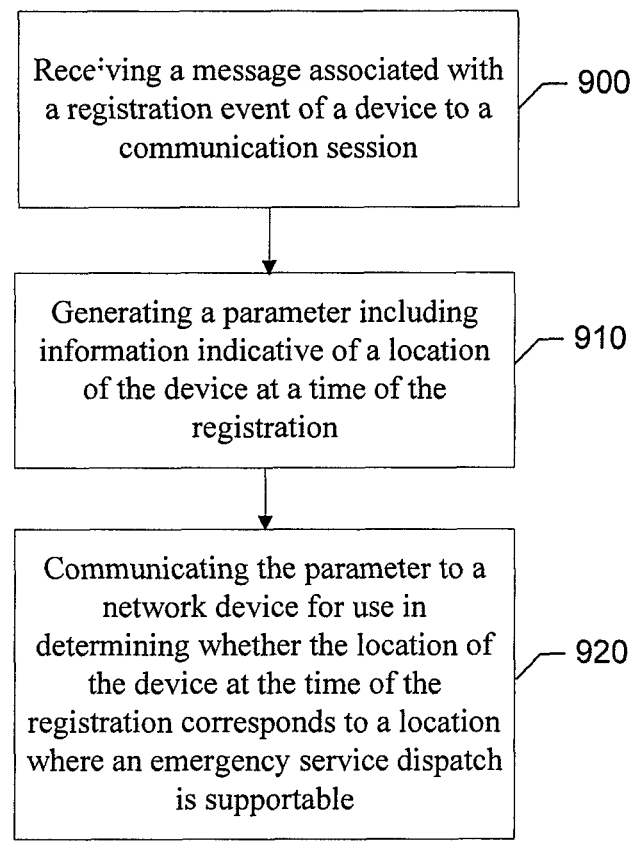
FIG. 9 is a flowchart according to another exemplary method and program product for providing emergency service validation according to an exemplary embodiment.

FIGS. 8 and 9 are flowcharts according to exemplary methods and computer program products for providing emergency service validation according to an exemplary embodiment. As shown in FIG. 8, the method (e.g., from the perspective of a location server) may include receiving a message associated with a registration event of a device to a communication session at operation 800. The communication session may be an IP based communication session such as SIP or push-to-talk (PTT). The message may be, for example, a registration message for registering the network node to a PTT service. The message may include at least one parameter having information indicative of a location of the device at a time of the registration. In an exemplary embodiment, the parameters may include an internal address and an external address associated with the device, a time of event associated with detection of the registration event and/or information indicative of a characteristic of the device. The parameters may be added to the message by a network component monitoring communication related to registration of the device. The method may further include determining whether the location of the device at the time of the registration corresponds to a location where an emergency service dispatch is supportable at operation 810. In this regard, for example, the determination may be made based on comparing the location of the device at the time of the registration with a location of the device at a previous validated registration event. The comparison may include comparing the external address to a stored external address from the previous validated registration event. In an exemplary embodiment, the method may further include an optional operation 820 of suspending a user account associated with the device until the location of the device corresponds to the location where the emergency service dispatch is supportable, if the location of the device at the time of the registration does not correspond with the location where the emergency service dispatch is supportable. The suspension may be lifted when the location corresponds to an area where the emergency service dispatch is supportable.

FIG. 9, which illustrates another method (e.g., from the perspective of a registration monitoring device) may include receiving a message associated with a registration event of a device to a communication session at operation 900. At operation 910, a parameter may be generated including information indicative of a location of the device at a time of the registration. The parameter may be communicated to a network device for use in determining whether the location of the device at the time of the registration corresponds to a location where an emergency service dispatch is supportable at operation 920. In an exemplary embodiment, operation 910 may include generating parameters including an internal address and an external address associated with the device, a time of event associated with detection of the registration event, and/or information indicative of a characteristic of the device.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method comprising:
receiving, at a first network device, a message associated with a registration event of a device to a communication session, the message including:
a parameter having information indicative of a geographic location of the device at a time of the registration event,
information indicating a time when the message is received, and
information identifying a type of the device;
providing, by the first network device, the message to a second network device;
receiving, by the first network device, a communication from the second network device,
the communication indicating whether the geographic location of the device, at the time of the registration event, corresponds to a geographic location where an emergency service dispatch is supportable, and a determination of whether the geographic location of the device corresponds to the geographic location where the emergency service dispatch is supportable being based on the parameter, the information indicating the time when the message is received, and the information identifying the type of the device; and
suspending, based on the communication from the second network device, a user account, associated with the device, until another geographic location of the device corresponds to the geographic location where the emergency service dispatch is supportable, when the geographic location of the device at the time of the registration event does not correspond to the geographic location where the emergency service dispatch is supportable.

2. The method of claim 1, where receiving the message comprises:
receiving a message associated with a request for registration for an Internet Protocol-based communication session.

3. The method of claim 1, where receiving the message comprises:
receiving parameters including an internal address or an external address associated with the device, the parameters being added to the message by a network component monitoring communication related to registration of the device.

4. The method of claim 1, where the determination of whether the geographic location of the device corresponds to the geographic location where the emergency service dispatch is supportable is further based on a comparison of the geographic location of the device at the time of the registration event with a location of the device at a time of a previously validated registration event.

5. The method of claim 4, where the comparison is based on a comparison of an external address to a stored external address from the previously validated registration event.

6. A non-transitory computer-readable storage medium storing instructions, the instructions comprising:
one or more instructions that, when executed by at least one processor, cause the at least one processor to receive a message associated with a registration event of a first device to a communication session, the message including:
a parameter associated with information indicative of a location of the first device at a time of the registration,
information indicating a time when the message is received, and
information identifying a type of the first device;
one or more instructions that, when executed by the processing logic, cause the processing logic to provide the message to a second device;
one or more instructions that, when executed by the at least one processor, cause the at least one processor to receive a communication from the second device,
the communication indicating a determination of whether the location of the first device, at the time of the registration event, corresponds to a location where an emergency service dispatch is supportable, and
the determination being based on the parameter, the information indicating the time when the message is received, and the information identifying the type of the first device; and
one or more instructions that, when executed by the at least one processor, cause the at least one processor to suspend a user account, associated with the first device, until the location of the first device corresponds to the location where the emergency service dispatch is supportable when the location of the first device at the time of the registration event does not correspond to the location where the emergency service dispatch is supportable.

7. The computer-readable storage medium of claim 6, where the message is associated with a request for registration for an Internet Protocol based communication session.

8. The computer-readable storage medium of claim 6, where the one or more instructions that cause the at least one processor to receive the message include one or more instructions that cause the at least one processor to receive parameters including an internal address and an external address associated with the first device, the parameters being added to the message by a network component monitoring communication related to registration of the first device.

9. The computer-readable storage medium of claim 6, where the one or more instructions that cause the at least one processor to determine whether the location of the first device, at the time of the registration event, corresponds to the location where the emergency service dispatch is supportable include one or more instructions that cause the at least one processor to compare the location of the first device at the time of the registration with a location of the first device at a time of a previously validated registration event.

10. The computer-readable storage medium of claim 9, where the one or more instructions that cause the at least one processor to compare the location of the first device at the time of the registration with the location of the first device at the time of the previously validated registration event include one or more instructions that cause the at least one processor to compare an external address to a stored external address from the previously validated registration event.

11. A system comprising:
one or more processors to:
receive a message associated with a registration event of a first device to a communication session, the message including:
parameters having information indicative of a location of the first device at a time of the registration event,
the parameters including information indicative of a type of the first device, the time of the registration event, and at least one of an external Internet protocol (IP) address of the first device or a source IP address of the first device;
provide the message to a second device;
receive a communication from the second device,
the communication indicating a determination of whether the location of the first device at the time of the registration event corresponds to a location where an emergency service dispatch is supportable, and
the determination being based on the parameters; and
suspend a user account associated with the first device until the location of the first device corresponds to the location where the emergency service dispatch is supportable when the location of the first device at the time of the registration event does not correspond to the location where the emergency service dispatch is supportable.

12. The system of claim 11, where the message is associated with a request for registration for an Internet Protocol-based communication session.

13. The system of claim 11, where the parameters are to be added to the message by a network component monitoring communication related to registration of the first device.

14. The system of claim 11, where, when determining whether the location of the first device at the time of the registration corresponds to the location where the emergency service dispatch is supportable, the one or more processors are to:
compare the location of the first device at the time of the registration with a location of the first device at a time of a previously validated registration event.

15. The system of claim 14, where, when comparing the location of the first device at the time of the registration with the location of the first device at the time of a previously validated registration event, the one or more processors are to:
compare the external IP address of the first device to a stored external address from the previously validated registration event.

16. A system comprising:
a first network device to:
receive a message associated with a registration event of a device to a communication session;
generate, based on the message, a plurality of parameters including information indicative of a location of the device at a time of the registration event,
the plurality of parameters including:
information indicating a time when the message is received, and
information identifying a type of the device;
communicate the plurality of parameters to a second network device to determine, based on the plurality of parameters, whether the location of the device at the time of the registration event corresponds to a location where an emergency service dispatch is supportable, and
suspend, based on a communication from the second network device, a user account associated with the device until the location of the device corresponds to the location where the emergency service dispatch is supportable when the location of the device at the time of the registration event does not correspond to the location where the emergency service dispatch is supportable.

17. The system of claim 16, where the plurality of parameters further include at least one of:
an external Internet protocol (IP) address of the device, or
a source IP address of the device.

* * * * *